United States Patent
Mutoh et al.

(10) Patent No.: US 6,818,722 B2
(45) Date of Patent: Nov. 16, 2004

(54) PREPARATION OF ORGANOPOLYSILOXANES

(75) Inventors: Kiyoyuki Mutoh, Annaka (JP); Yasuhito Mohara, Annaka (JP); Susumu Ueno, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 7 days.

(21) Appl. No.: 10/349,082

(22) Filed: Jan. 23, 2003

(65) Prior Publication Data

US 2003/0153711 A1 Aug. 14, 2003

(30) Foreign Application Priority Data

Jan. 25, 2002 (JP) ..................................... 2002-016640

(51) Int. Cl.[7] .............................................. C08G 77/24
(52) U.S. Cl. ............................ 528/20; 528/12; 528/39; 556/458
(58) Field of Search ............................. 528/12, 20, 39; 556/458

(56) References Cited

U.S. PATENT DOCUMENTS

| | | |
|---|---|---|
| 2,676,182 A | 4/1954 | Daudt et al. |
| 2,814,601 A | 11/1957 | Currie et al. |
| 5,391,673 A | 2/1995 | Ekeland et al. |
| 5,686,550 A * | 11/1997 | Noto et al. |

FOREIGN PATENT DOCUMENTS

| | | | |
|---|---|---|---|
| EP | 1 113 036 | * | 4/2001 |
| JP | 63-256628 A | | 10/1988 |
| JP | 2001-192453 A | | 7/2001 |

OTHER PUBLICATIONS

Windholz et al., The Merck Index, 9th Ed., 1976, p. 500.*

* cited by examiner

*Primary Examiner*—Kuo-Liang Peng
(74) *Attorney, Agent, or Firm*—Birch, Stewart, Kolasch & Birch, LLP

(57) ABSTRACT

For the preparation of organopolysiloxanes, water glass diluted with water to a concentration of 3 to 15 wt % is reacted with a triorganohalosilane in the presence of an acid and an oxygen-containing solvent such as isobutyl alcohol, methyl isobutyl ketone or 1-pentanol. The invention achieves a considerable reduction of the environmental load, an improved utilization of reactants, an improved yield, and a cost reduction, and enables production of low viscosity MQ resins.

11 Claims, 1 Drawing Sheet

PREPARATION OF ORGANOPOLYSILOXANES

This nonprovisional application claims priority under 35 U.S.C. §119(a) on Patent Application No. 2002-016640 tiled in JAPAN on Jan. 25, 2002, which is herein incorporated by reference.

TECHNICAL FIELD

This invention relates to a method for preparing organopolysiloxanes or MQ resins using water glass as a starting material.

BACKGROUND OF THE INVENTION

A class of organopolysiloxanes, generally referred to as MQ resins, are well known in the art (see U.S. Pat. Nos. 2,676,182, 2,814,601, 5,391,673, JP-A 63-256628 and JP-A 2001-192453).

MQ resins are characterized in that they contain M units ($R_3SiO_{1/2}$) and Q units ($SiO_2$) in the siloxane chain and they are soluble in toluene and other solvents as opposed to silicone resins containing Q units which are generally insoluble in such solvents. It is described in the above-referred patents that D units ($R_2SiO$) and T units ($RSiO_{3/2}$) can be introduced into the structure using additional reactants having such units and that monovalent organic groups represented by R can vary over a wide range.

These MQ resins have a film forming ability and compatibility and are widely employed as a major starting material for silicone pressure-sensitive adhesives, cosmetic bases, liquid injection molding materials, and mold release agents and as a strength enhancing component for silicone rubber.

In view of the Q unit-providing source, processes of making MQ resins are generally divided into two processes, water glass process and silicate process. The silicate process is sub-divided into a process starting with silicon tetrachloride and alcohol and a process starting with a commercially available material such as ethyl silicate.

In the recent years, the environmental problem has become of interest. It is very important to control the quality of industrial waste water. The waste water contains organic components which are mostly organic solvents, unreacted reactants, and by-products. It is urgently required to develop a process capable of minimizing the discharge of such valuable components.

In view of the above, the prior art water glass process has the following problems.
(i) Waste water has an increased biochemical oxygen demand (BOD). The use of an alcohol which is well compatible with water entails an increased cost for alcohol recovery.
(ii) M unit charge is in large excess, exacerbating the utilization of starting reactant.
(iii) Siloxane yield is low.
(iv) Reaction proceeds in multiple stages, exacerbating the efficiency of plant utilization.
(v) Product control is difficult due to a difference between charge M/Q and product M/Q.

More particularly, in the prior art process, water serving as a solvent for water glass, a hydrocarbon solvent (e.g., toluene, xylene) serving as a solvent for both the reactant and the silane/siloxane product, and a water-soluble lower alcohol (e.g., ethanol, isopropanol) which is highly compatible with both the solvents are added in large amounts to form a heterogeneous solvent mixture of water/alcohol/hydrocarbon solvent in which Q units are converted to a solvent-soluble MQ resin. Best results are obtained when this reaction is conducted in multiple stages including at least two stages of neutralization reaction of water glass and subsequent MQ conversion reaction. As a consequence, the MQ resin produced is extracted to the side of hydrocarbon solvent (typically toluene) which is incompatible with water. The alcohol used herein enters the water layer which is treated as waste water. This is the reason why waste water has a high BOD value.

SUMMARY OF THE INVENTION

An object of the invention is to provide a method for preparing organopolysiloxanes or MQ resins using water glass as a starting reactant while substantially overcoming the above-described problems.

Making research on the solvent which enables reaction while minimizing the amount thereof migrating to the water layer, the inventor has discovered that a specific oxygen-containing solvent has a notable capability and makes it possible to reduce the BOD value of waste water below one tenth of the prior art value. Based on the empirical fact that the molecular weight of MQ resin lowers as the concentration of water glass is reduced, the inventor has discovered that a combination of low concentration water glass with the specific solvent enables simplification from the multi-stage process to a single-stage process and simultaneously overcomes the problem of disagreement between charge M/Q and product M/Q during synthesis that has been believed unsolvable in the prior art. The present invention is predicated on these findings.

Accordingly, the present invention provides a method for preparing an organopolysiloxane by reacting water glass diluted with water to a concentration of 3 to 15% by weight with a triorganohalosilane in the presence of an acid and an oxygen-containing solvent having a solubility of at least 1% by weight in water at room temperature (20° C.), but not completely compatible with water, and having a boiling point of up to 220° C.

DETAILED DESCRIPTION OF THE INVENTION

Figure 1:
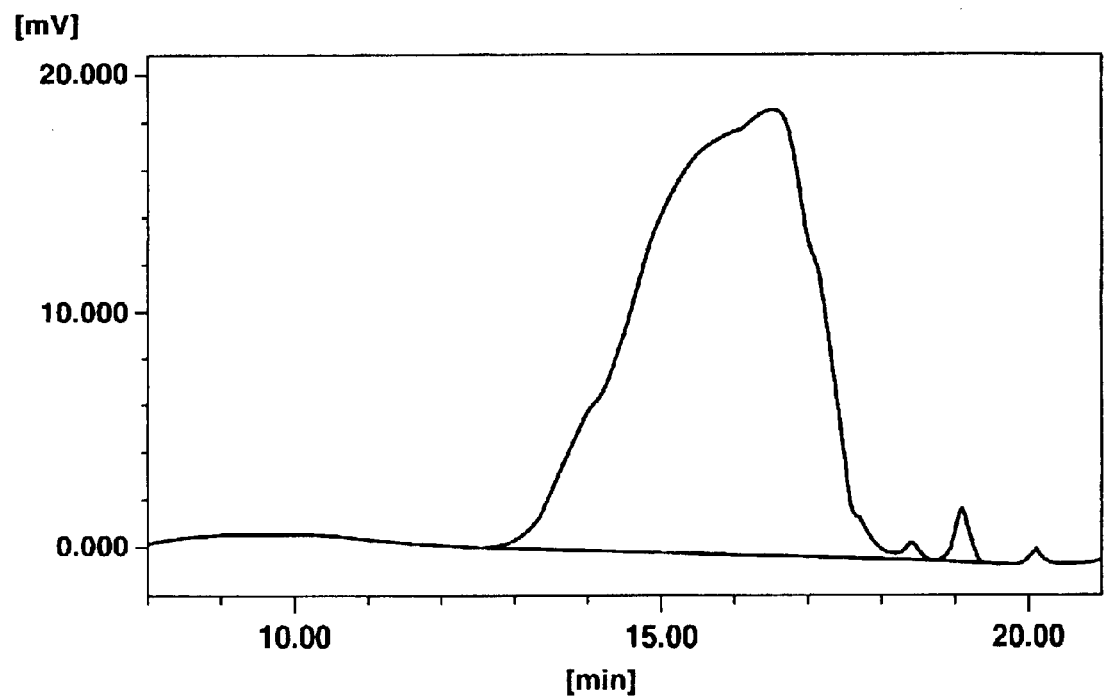
FIG. 1 is a GPC chart showing the molecular weight distribution of the MQ resin of Comparative Example 1.

The method for preparing an organopolysiloxane or MQ resin according to the invention starts with water glass which provides Q units and a triorganohalosilane which provides M units.

The Q unit-providing water glass used herein may be commonly used water glass or sodium silicate. Water glass is available as JIS standard products, Nos. 1, 2 and 3 having different $SiO_2/Na_2O$ ratios. It is known that a degree of polymerization decreases as water glass is diluted with water to a lower concentration. In view of the stability of material and the reliability and stability of reaction, the present invention requires that water glass be diluted with water to a low concentration before the start of reaction. However, excessive dilution gives rise to problems relating to the amount of solvent migrating into waste water, heterogeneous system reaction, and plant size. It is thus essential that water glass be diluted with water to a $SiO_2$ concentration of 3 to 15% by weight.

The M unit-providing triorganohalosilane used herein has the formula: $R_3SiX$ wherein R which may be identical or different atoms or groups is hydrogen or a substituted or unsubstituted monovalent hydrocarbon group and X is a halogen atom such as chlorine. Suitable monovalent hydrocarbon groups are those of 1 to 10 carbon atoms, especially 1 to 8 carbon atoms and include alkyl groups such as methyl, ethyl, propyl, butyl, hexyl, octyl and decyl; cycloalkyl groups such as cyclohexyl; alkenyl groups such as vinyl, allyl, propenyl and butenyl; aryl groups such as phenyl, tolyl and xylyl; aralkyl groups such as benzyl and phenylpropyl; and substituted groups of the foregoing in which some or all of the hydrogen atoms are substituted with halogen atoms or the like. Of these, methyl, phenyl and vinyl are preferred. The triorganohalosilanes may be used alone or in admixture.

Water glass and triorganohalosilane are used in any appropriate proportion. It is preferred in view of yield to use 0.5 to 1.5 moles, especially 0.6 to 1.0 moles of triorganohalosilane per mole of $SiO_2$ in water glass. Outside the range, a lower molar ratio may lead to a loss of the Q unit source (water glass) whereas a higher molar ratio may lead to a loss of the M unit source (triorganohalosilane).

If desired for a particular use or purpose of the product, a D unit component having the general formula: $R_2SiO$ and/or a T unit component having the general formula: $RSiO_{3/2}$ may be incorporated in the product structure using the corresponding silane/siloxane form reactants, and hydrogen, methyl, ethyl, phenyl, vinyl and the like can be used in combination as the R groups. These modifications are described in the above-referred patents, and the same discussion is applicable to the present invention.

The reaction catalyst is an acid which is typically selected from well-known acids including sulfuric acid, hydrochloric acid, sulfonic acids, solid acids such as activated clay, and trifluoroacetic acid. In order that the acid neutralize $Na_2O$ in the water glass together with the simultaneously added triorganohalosilane and function as a catalyst, the amount of acid used must be in excess of the neutralization equivalent. The excess amount of acid is desirably 0.1 to 10%, more desirably 0.5 to 5% based on the total weight of water glass, water and triorganohalosilane added. Adding a large excess of the acid does not interfere with the progress of reaction, but can lead to an increase of environmental load and a decline of productivity.

According to the invention, the reaction solvent is an oxygen-containing solvent having a limited relative solubility in water, specifically a solubility of at least 1% by weight in water at room temperature (20° C.), but not completely compatible with water, and having a boiling point of up to 220° C.

Typical of the oxygen-containing solvent of interest are various alcohols of about 4 to about 8 carbon atoms inclusive of cyclic compounds, but exclusive of tert-butyl alcohol, ketones inclusive of cyclic compounds such as methyl ethyl ketone (MEK), ethers, and acetates. Illustrative examples include alcohols such as n-, iso- and sec-butyl alcohol, n-, iso-, sec- and tert-pentanol, sec-hexanol, phenol and cyclohexanol;

ketones such as methyl ethyl ketone (MEK), methyl propyl ketone, diethyl ketone, methyl n-butyl ketone, methyl isobutyl ketone (MIBK), ethyl butyl ketone, mesityl oxide, cyclohexanone, 2,4-pentanedione and isophorone;

ethers such as ethyl ether, isopropyl ether, 4-methyldioxolane, dimethyldioxane, ethylene glycol diethyl ether, ethylene glycol mono-n-hexyl ether, and ethylene glycol mono-2-ethyl butyl ether; and esters such as diethyl carbonate, methyl formate, ethyl formate, propyl formate, methyl acetate, ethyl acetate, n-propyl acetate, isopropyl acetate, amyl acetate mixtures, methyl acetoacetate, ethyl acetoacetate, ethylene glycol monoethyl ether acetate, glycol diacetate, butyl lactate, methyl acrylate, and ethyl acrylate.

Of these, isobutyl alcohol, MIBK and 1-pentanol are preferred.

The type and amount of the solvent may be selected in accordance with the desired properties of MQ resin to be produced, and production requirements such as yield and waste water load. It is not always prohibited to use a hydrocarbon solvent in combination with the oxygen-containing solvent.

The proportion of water and the solvent must be set optimum because their relative solubility dictates a waste water load and the proportion can affect the molecular weight, structure, properties and yield of the end MQ resin. The amounts of water and the solvent used are not critical. The amount of water used, which is the sum of a portion used to dilute water glass and a portion used to dilute a mixture of the triorganohalosilane, solvent and catalyst, is preferably 120 to 600 parts by weight, more preferably 200 to 400 parts by weight, per 100 parts by weight of water glass. The amount of the solvent used is preferably 5 to 100 parts by weight, more preferably 10 to 50 parts by weight, per 100 parts by weight of water.

In the method of the invention, the acid is admixed with the triorganohalosilane and oxygen-containing solvent, and water glass is then added to the resulting mixture.

Specifically, water glass as the Q unit source is diluted with water to a $SiO_2$ concentration of 15% or less.

Next, in accordance with a conventional procedure, an acid serving as a neutralizing agent for water glass and a reaction catalyst, typically hydrochloric acid or sulfuric acid, is dissolved in water. This solution is then admixed with trimethylchlorosilane as the M unit source and an oxygen-containing solvent. With stirring, the water glass dilution is added to this mixture. Then neutralization and MQ conversion reactions take place. At this point, the reaction system is maintained acidic. The temperature is as usual, that is, below room temperature (20° C.), preferably below 10° C.

A necessary amount of additional solvent is added to the reaction solution, which is heated and held under reflux for several hours to complete the reaction. The reaction solution is allowed to stand whereupon it separates into two layers. The lower layer is discharged. The acidic upper layer is neutralized with an alkali, and the unnecessary solvents are distilled off to adjust the concentration of the product, which becomes a final product after purification and filtration. The steps following the neutralization and MQ conversion reactions are the same as in the conventional process.

In general, the mixing ratio is determined using the reaction molar ratio as a primary factor. However, the reaction varies, in practice, with various other factors. Thus, many modifications have been made in accordance with the actual reaction product. With regard to the M/Q ratio in question, M units are incorporated in a large excess relative to the desired molecular structure in the prior art, and an improvement in this regard is one of the objects of the present invention. As will be later demonstrated in Examples, the use of the solvent system according to the invention ensures that the molar ratio is equal to the theory. It is noted that the M/Q ratio of the product can be accurately measured by $^{29}Si$-NMR.

The MQ resin preparing method of the invention is successful in increasing the yield of resin products and significantly reducing the amount of organic components carried to the waste water for thereby reducing the BOD load. The charge M/Q can be in agreement with the product M/Q, which ensures steady preparation of the product and facilitates the design of a new product. The utilization of the M unit-providing source which is expensive is significantly improved. The manufacturing process is shortened. All these contribute to considerable cost reductions. Another notable advantage is that the invention enables preparation of low viscosity resins which are believed difficult in the prior art.

EXAMPLE

Examples of the invention are given below by way of illustration and not by way of limitation. All parts and percents are by weight.

Comparative Example 1

With stirring, a premix of 480 parts of water glass and 268 parts of water shown as group A in Table 1 was added dropwise over 30 minutes to a mixture of 202 parts of hydrochloric acid and 794 parts of water, adjusted at 5° C. and shown as group B in Table 1. During the dropwise addition step, the temperature was maintained in the range of 0 to 10° C. At the end of dropwise addition, 527 parts of isopropyl alcohol (IPA) in group B was immediately added, and a premix of 317 parts of trichlorosilane and 366 parts of toluene in group B was further added. At the end of addition, the solution was heated at 60° C. and held at the temperature for 30 minutes. Thereafter, the lower layer of hydrochloric acid and IPA-containing waste acid was separated. After removal of the lower layer, the upper layer was neutralized by well-known means, for example, with sodium bicarbonate. The product was worked up by solvent replacement with toluene, adjustment to a solids content of 60% and filtration of the neutralized salt. A MQ resin having a M/Q ratio of 0.85 was obtained in a yield of 75% as shown in Table 1. The M/Q ratio of the charge was 1.26, indicating a loss of M reaching 32%.

For the lower layer (waste acid layer), the amount of waste acid and the concentration of IPA were measured. There was 2,195 parts of waste acid having an IPA concentration of 16.87%. The data indicate that 70.2% of the IPA charge migrated into the waste water. Provided that IPA has a BOD load coefficient of 1.8 BOD kg/kg, a BOD load per kg of resin solids was calculated to be 2.82 BOD kg/kg.

Example 1

With stirring, a premix of 595 parts of water glass No. 3 and 1,000 parts of water, adjusted to a $SiO_2$ concentration of 10.8%, shown as group A in Table 1 was added dropwise over one hour to a mixture of 90 parts of hydrochloric acid, 700 parts of water, 350 parts of isobutyl alcohol (IBA) and 266 parts of trimethylchlorosilane, adjusted at 5° C. and shown as group B in Table 1. During the dropwise addition step, the temperature was maintained in the range of 0 to 10° C. At the end of dropwise addition, the temperature was brought to 60° C., and 400 parts of toluene in group C was added and mixed. The solution was held at the temperature for 30 minutes. Thereafter, the lower layer of hydrochloric acid and IPA-containing waste water was separated. After removal of the lower layer, the upper layer was neutralized by well-known means, for example, with sodium bicarbonate. The product was worked up by solvent replacement with toluene, adjustment to a solids content of 60% and filtration of the neutralized salt. A MQ resin having a M/Q ratio of 0.84 was obtained in a yield of 92% as shown in Table 1. The M/Q ratio of the charge was 0.85, indicating that the resin synthesized had substantially the same composition as the charge.

For the lower layer (waste acid layer), the amount of waste acid and the concentration of IBA were measured. There was 2,385 parts of waste acid having an IBA concentration of 2.08%. The data indicate that only 14.2% of the IBA charge migrated into the waste water. Provided that IBA has a BOD load coefficient of 1.9 BOD kg/kg, a BOD load per kg of resin solids was calculated to be 0.27 BOD kg/kg.

With attention paid to the water solubility of IBA and the low degree of polymerization of low concentration water glass, this Example carried out reaction while the conventional water glass/IPA-toluene system was replaced by a low concentration water glass/IBA system and the M/Q molar ratio of the charge was brought in agreement with the conventional finished product, succeeding in manufacturing the desired product. As opposed to the prior art charge wherein M was fed in a large-excess-of-theory amount relative to Q, equimolar reaction was confirmed in this Example.

The yield of the resin was as high as 95% as opposed to 75% of the prior art method (dropwise addition of water glass aqueous solution to aqueous hydrochloric acid using IPA solvent→IPA addition→trimethylchlorosilane addition; Comparative Example 1). The BOD load was 0.27 as opposed to 3.91 of the prior art method, indicating that the BOD load decreased to only 7% of the prior art BOD load. The yield of M unit-providing source was 99%, that is, in good agreement with the theory, as opposed to 67% in Comparative Example 1. With respect to the use, the resin showed equivalent performance.

Figure 2:
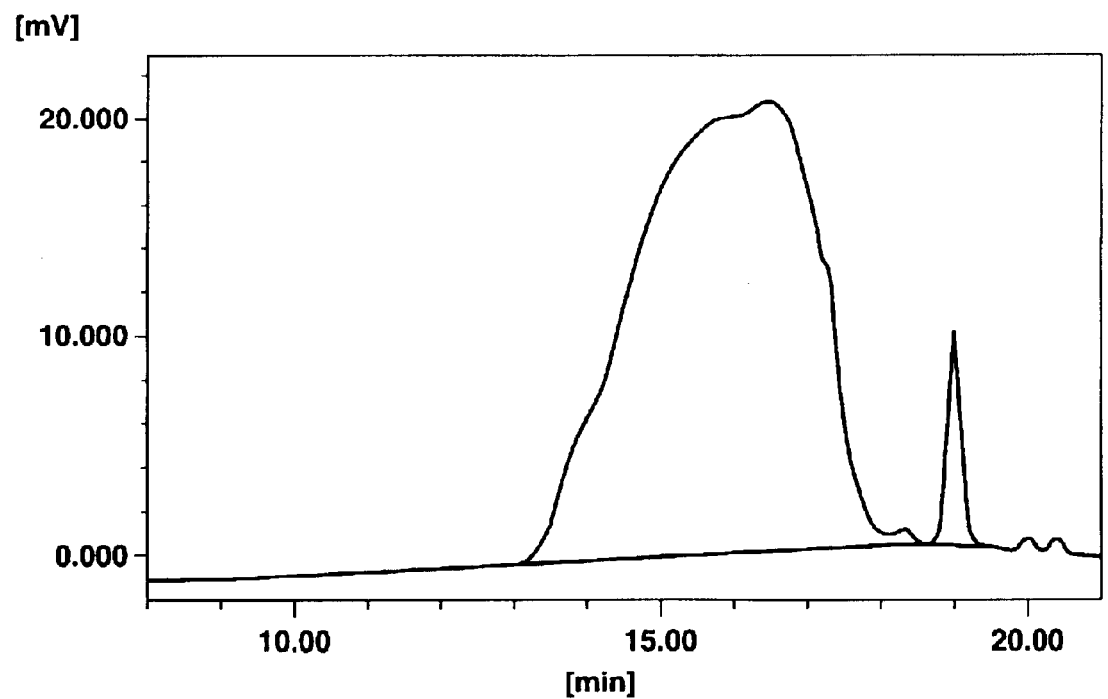
FIG. 2 is a GPC chart showing the molecular weight distribution of the MQ resin of Example 1.

FIGS. 1 and 2 are GPC charts showing the molecular weight distribution of the MQ resins of Comparative Example 1 and Example 1, respectively.

Example 2

Reaction was carried out as in Example 1 except that the catalyst was changed from hydrochloric acid to sulfuric acid. Substantially the same resin was obtained.

The Cl load became lower than that of Example 1 and was 0.23 which was less than one-third of 0.85 in the prior art. A low viscosity resin could be produced in a simple manner, which was believed difficult to synthesize in the prior art.

Comparative Example 2

Reaction was carried out as in Example 2 except that the solvent was changed to water-soluble IPA. Despite this change, substantially the same resin was obtained. The BOD load was 1.57 which was improved over the prior art method, but considerably inferior to the case of IBA.

The components used in Examples 1–2 and Comparative Examples 1–2 are shown in Table 1 together with the properties of the MQ resins produced as well as the Cl load and BOD load.

TABLE 1

| Components (pbw) | | Comparative Example 1 | Example 1 | Example 2 | Comparative Example 2 |
|---|---|---|---|---|---|
| Water glass $SO_2$ concentration | | 18.6 | 10.8 | 10.8 | 10.8 |
| A | Water | 268 | 1000 | 1000 | 1000 |
|   | Water glass #3 | 480 | 595 | 595 | 595 |
| B | Conc. hydrochloric acid | 202 | 90 | | |
|   | Conc. sulfuric acid | | | 42 | 42 |
|   | Water | 794 | 700 | 700 | 700 |

TABLE 1-continued

| Components (pbw) | Comparative Example 1 | Example 1 | Example 2 | Comparative Example 2 |
|---|---|---|---|---|
| Trimethylchlorosilane | 317 | 266 | 266 | 266 |
| IPA | 527 | | | 350 |
| IBA | | 350 | 350 | |
| Toluene | 366 | | | |
| C  Toluene (post addition) | | 400 | 400 | 400 |
| Cl load (kg/kg of product) | 0.846 | 0.319 | 0.234 | 0.234 |
| BOD load (kg/kg of product solids) | 2.82 | 0.27 | 0.27 | 1.57 |
| Solids yield (%) | 75 | 92 | 92 | 92 |
| Charge M/Q | 1.26 | 0.85 | 0.85 | 0.85 |
| Product M/Q | 0.85 | 0.84 | 0.84 | 0.85 |
| Viscosity of 60% toluene solution of solids (cs) | 7.8 | 8.1 | 6.1 | 6.0 |

Examples 3–8 and Comparative Example 3

MQ resins were produced as in Example 1, using the components shown in Tables 2 and 3.

Specifically, in Examples 3 to 5, the solvent used in Example 2 was changed from IBA to methyl ethyl ketone (MEK), methyl isobutyl ketone (MIBK) or n-pentanol. In any case, stoichiometric progress of reaction was confirmed. In particular, n-pentanol having a low water solubility had a theoretical BOD load of 0.02, suggesting a surprising possibility that the BOD load become 1/200 of that of Comparative Example 1.

In Examples 6 to 8 and Comparative Example 3, four isomers of butyl alcohol including IBA were used at a M/Q formulation different from that of Example 2. The desired results were obtained with three isomers other than water-soluble tert-butyl alcohol.

The results are shown in Tables 2 and 3.

TABLE 2

| Components (pbw) | Example 3 | Example 4 | Example 5 |
|---|---|---|---|
| Solvent | MEK | MIBK | n-pentanol |
| A  Water | 1000 | 1000 | 1000 |
| Water glass #3 | 595 | 595 | 595 |
| B  Conc. sulfuric acid | 42 | 42 | 42 |
| Water | 700 | 700 | 700 |
| Trimethylchlorosilane | 266 | 266 | 266 |
| MEK | 350 | | |
| MIBK | | 350 | |
| n-Pentanol | | | 350 |
| C  Toluene (post addition) | 400 | 400 | 400 |
| Cl load (kg/kg of product) | 0.234 | 0.234 | 0.234 |
| BOD load (kg/kg of product solids) | | | |
| Siloxane yield (%) | 84 | 81 | 96 |
| Charge M/Q | 0.85 | 0.85 | 0.85 |
| Product M/Q | 0.84 | 0.82 | 0.84 |
| Viscosity of 60% toluene solution of siloxane (cs) | 15.3 | 19.5 | 33.2 |

TABLE 3

| Components (pbw) | Example 6 | Example 7 | Example 8 | Comparative Example 3 |
|---|---|---|---|---|
| Solvent | n-butanol | iso-butanol | sec-butanol | tert-butanol |
| A  Water | 1000 | 1000 | 1000 | 1000 |
| Water glass #3 | 595 | 595 | 595 | 595 |
| B  Conc. sulfuric acid | 42 | 42 | 42 | 42 |
| Water | 700 | 700 | 700 | 700 |
| Trimethylchlorosilane | 238 | 238 | 238 | 238 |
| n-Butanol | 350 | | | |
| iso-Butanol | | 350 | | |
| sec-Butanol | | | 350 | |
| tert-Butanol | | | | 350 |
| C  Toluene (post addition) | 400 | 400 | 400 | 400 |
| Cl load (kg/kg of product) | 0.222 | 0.222 | 0.222 | 0.222 |
| BOD load (kg/kg of product solids) | | 0.27 | | |
| Siloxane yield (%) | 88 | 85 | 81 | gelled |
| Charge M/Q | 0.76 | 0.76 | 0.76 | 0.76 |
| Product M/Q | 0.77 | 0.76 | 0.73 | — |
| Viscosity of 60% toluene solution of siloxane (cs) | 7.9 | 8.5 | 7.6 | — |

Examples 9–11

For confirmation purposes, reaction was carried out at M/Q levels which were determined in accordance with the range of currently available products as shown in Table 4. The desired results were obtained. This demonstrates that the invention is applicable to the range of all products currently used in practice. Low viscosity resins could be produced in a simple manner, which were believed difficult to synthesize in the prior art.

Examples 12–14 and Comparative Example 4

Reaction was carried out while varying the concentration of water glass as shown in Table 4. As the water glass concentration became higher, the difference between charge M/Q ratio and product M/Q ratio became larger, and the yield of the resin became lower. These data demonstrated that use of water glass in a low concentration was essential. It was confirmed that low concentration diluted water glass was effective for producing low viscosity resins.

Example 15

This example demonstrates one exemplary MQ resin (designated $MD^{vi}Q$) having D units and vinyl (Vi) groups as organic groups incorporated in the molecule as shown in Table 4.

It was confirmed that the $D^{vi}$ units were incorporated substantially theoretically, indicating that the present invention is applicable to not only basic MQ resins, but also derivatives thereof.

TABLE 4

| Components (pbw) | | Example 9 M/Q 1.02 | Example 10 M/Q 0.85 | Example 11 M/Q 0.71 | Example 12 water glass concentration, SiO$_2$ 5.4% | Example 13 water glass concentration, SiO$_2$ 10.8% | Example 14 water glass concentration, SiO$_2$ 14.4% | Comparative Example 4 water glass concentration, SiO$_2$ 21.6% | Example 15 MDQ type |
|---|---|---|---|---|---|---|---|---|---|
| A | Water | 1000 | 1000 | 1000 | 2600 | 1000 | 600 | 205 | 850 |
|   | Water glass #3 | 595 | 595 | 595 | 595 | 595 | 595 | 595 | 425 |
| B | Conc. sulfuric acid | 42 | 42 | 42 | 42 | 42 | 42 | 42 | 45 |
|   | Water | 700 | 700 | 700 | 700 | 700 | 700 | 700 | 452 |
|   | Trimethylchlorosilane | 320 | 266 | 220 | 266 | 266 | 266 | 266 | 170 |
|   | Vinylmethyldichlorosilane | | | | | | | | 40 |
|   | IBA | 350 | 350 | 350 | 350 | 350 | 350 | 350 | 250 |
| C | Toluene (post addition) | 400 | 400 | 400 | 400 | 400 | 400 | 400 | |
|   | Xylene (post addition) | | | | | | | | 400 |
| Cl load (kg/kg of product) | | 0.25 | 0.23 | 0.21 | 0.23 | 0.23 | 0.23 | 0.23 | 0.28 |
| BOD load (kg/kg of product solids) | | 0.25 | 0.27 | 0.30 | 0.28 | 0.27 | 0.28 | 0.35 | |
| Siloxane yield (%) | | 91 | 92 | 91 | 91 | 92 | 89 | 71 | 89 |
| Charge M/Q | | 1.02 | 0.85 | 0.71 | 0.85 | 0.85 | 0.85 | 0.85 | 0.76 |
| Product M/Q | | 0.98 | 0.84 | 0.71 | 0.85 | 0.84 | 0.84 | 0.61 | |
| Viscosity of 60% toluene solution of siloxane (cs) | | 4.4 | 6.1 | 8.5 | 6.0 | 6.1 | 7.1 | 16.5 | 3.0 |
| Charge vinyl value (mol/100 g solids) | | — | — | — | — | — | — | — | 0.10 |
| Product vinyl value (mol/100 g solids) | | — | — | — | — | — | — | — | 0.09 |

The present invention achieves a considerable reduction of the environmental load, an improvement in the utilization of reactants, an improvement in yield, and a cost reduction, and enables production of low viscosity MQ resins.

Japanese Patent Application No. 2002-016640 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing an organopolysiloxane, comprising the steps of:
   mixing an acid with a triorganohalosiloxane and an oxygen-containing solvent to form a mixture; and
   adding water glass to the mixture to conduct a reaction producing the organosiloxane,
   wherein the water glass is diluted with water to a concentration of 3 to 15% by weight and the oxygen-containing solvent has a solubility of at least 1% by weight in water at room temperature, but is not completely compatible with water, and has a boiling point of up to 220° C.

2. The method of claim 1 wherein the oxygen-containing solvent is isobutyl alcohol, methyl isobutyl ketone, 1-pentanol or a mixture thereof.

3. The method of claim 1, wherein the triorganohalosilane has the formula: $R_3SiX$ wherein each R group is identical to or different from the other R groups and is hydrogen or a substituted or unsubstituted monovalent hydrocarbon group, and X is a halogen atom.

4. The method of claim 3, wherein X is chlorine.

5. The method of claim 3, wherein R is a substituted or unsubstituted monovalent hydrocarbon group of 1 to 8 carbon atoms, and the substituted monovalent hydrocarbon groups are substituted with halogen atoms.

6. The method of claim 3, wherein R is selected from the group consisting of methyl, phenyl and vinyl.

7. The method of claim 1, wherein 0.5 to 1.5 moles of triorganohalosilane per mole of $SiO_2$ in the water glass is used.

8. The method of claim 1, wherein the acid is selected from the group consisting of sulfuric acid, hydrochloric acid, sulfonic acids, activated clay, and trifluoroacetic acid.

9. The method of claim 1, wherein the oxygen-containing solvent is selected from the group consisting of
   n-butyl alcohol, iso-butyl alcohol, sec-butyl alcohol, n-pentanol, iso-pentanol, sec-pentanol, tert-pentanol, sec-hexanol, phenol, cyclohexanol, methyl ethyl ketone (MEK), methyl propyl ketone, diethyl ketone, methyl n-butyl ketone, methyl isobutyl ketone (MIBK), ethyl butyl ketone, mesityl oxide, cyclohexanone, 2,4-pentanedione, isophorone, ethyl ether, isopropyl ether, 4-methyldioxolane, dimethyldioxane, ethylene glycol diethyl ether, ethylene glycol mono-n-hexyl ether, and ethylene glycol mono-2-ethyl butyl ether, diethyl carbonate, methyl formate, ethyl formate, propyl formate, methyl acetate, ethyl acetate, n-propyl acetate, isopropyl acetate, amyl acetate mixtures, methyl acetoacetate, ethyl acetoacetate, ethylene glycol monoethyl ether acetate, glycol diacetate, butyl lactate, methyl acrylate, and ethyl acrylate.

10. The method of claim 1, wherein the amount of water used, which is the sum of a portion used to dilute water glass and a portion used to dilute a mixture of the triorganohalosilane, solvent and acid, is 120 to 600 parts by weight per 100 parts by weight of water glass.

11. The method of claim 2, wherein the triorganohalosilane is $R_3SiX$ wherein each R group is identical to or different from the other R groups and is hydrogen or a substituted or unsubstituted monovalent hydrocarbon group, and X is a halogen atom.

* * * * *